(12) United States Patent
Nayar et al.

(10) Patent No.: US 11,567,335 B1
(45) Date of Patent: Jan. 31, 2023

(54) SELECTOR INPUT DEVICE TO TARGET RECIPIENTS OF MEDIA CONTENT ITEMS

(71) Applicant: Snap Inc., Santa Monica, CA (US)

(72) Inventors: Shree K. Nayar, New York, NY (US); Karl Bayer, New York, NY (US)

(73) Assignee: Snap Inc., Santa Monica, CA (US)

( * ) Notice: Subject to any disclaimer, the term of this patent is extended or adjusted under 35 U.S.C. 154(b) by 24 days.

(21) Appl. No.: 16/915,280

(22) Filed: Jun. 29, 2020

Related U.S. Application Data

(60) Provisional application No. 62/868,731, filed on Jun. 28, 2019.

(51) Int. Cl.
| | |
|---|---|
| G02B 27/01 | (2006.01) |
| H04N 5/225 | (2006.01) |
| H04N 5/232 | (2006.01) |
| G06F 3/0362 | (2013.01) |

(52) U.S. Cl.
CPC ....... *G02B 27/0176* (2013.01); *G06F 3/0362* (2013.01); *H04N 5/2252* (2013.01); *H04N 5/232935* (2018.08); *G02B 2027/0178* (2013.01)

(58) Field of Classification Search
CPC .......... G09B 5/065; G09B 19/00; G09B 5/04; G06T 7/0044; G06T 13/80; G06K 9/78
See application file for complete search history.

(56) References Cited

U.S. PATENT DOCUMENTS

| | | | |
|---|---|---|---|
| 9,482,883 B1 * | 11/2016 | Meisenholder | G02C 5/2272 |
| 10,250,948 B1 * | 4/2019 | Bortz | H04B 10/60 |
| 10,750,209 B1 * | 8/2020 | Edwards | H04N 21/442 |
| 11,095,924 B1 * | 8/2021 | Chee | H04W 4/10 |
| 2006/0200413 A1 * | 9/2006 | Kessel | G06Q 30/02 705/50 |
| 2011/0213664 A1 * | 9/2011 | Osterhout | G06F 3/013 705/14.58 |
| 2012/0075168 A1 * | 3/2012 | Osterhout | G06F 3/011 345/8 |
| 2013/0215024 A1 * | 8/2013 | Nakayama | A63F 13/213 345/157 |
| 2013/0260896 A1 * | 10/2013 | Miura | A63F 13/47 463/42 |
| 2016/0080445 A1 * | 3/2016 | Kazerani | H04L 67/06 709/219 |
| 2016/0136882 A1 * | 5/2016 | Cobbett | A41D 1/005 156/218 |
| 2016/0263477 A1 * | 9/2016 | Ladd | A63F 13/212 |

(Continued)

*Primary Examiner* — William Lu
(74) *Attorney, Agent, or Firm* — Schwegman Lundberg & Woessner, P.A.

(57) ABSTRACT

An apparatus to target recipients of media content items comprises a camera, a communication interface, and a selector input device. The selector input device is communicatively coupled to the camera and the communication interface and has settings associated with groups of recipients. The groups of recipients include a first group and a second group. In response to receiving a selection of a first setting from the selector input device, the camera captures a first media content item and the communication interface transmits the first media content item to the first group. The selector input device can be a rotary wheel. To select the first setting from the plurality of settings, the user can rotate the rotary wheel to the first setting and press the rotary wheel. Other embodiments are described herein.

20 Claims, 6 Drawing Sheets

(56) References Cited

U.S. PATENT DOCUMENTS

| | | | | |
|---|---|---|---|---|
| 2017/0124713 | A1* | 5/2017 | Jurgenson | G06K 9/78 |
| 2017/0185254 | A1* | 6/2017 | Zeng | G06Q 10/101 |
| 2018/0124446 | A1* | 5/2018 | Tudor | H04L 65/4076 |
| 2018/0167688 | A1* | 6/2018 | Lewis | H04N 21/4882 |
| 2018/0204475 | A1* | 7/2018 | Ochoa Delgado | G09B 5/02 |
| 2018/0336645 | A1* | 11/2018 | Price | G06Q 50/01 |
| 2019/0141106 | A1* | 5/2019 | Hertz | H04L 65/607 |
| 2019/0199936 | A1* | 6/2019 | Tokiwa | H04N 5/232 |
| 2020/0120160 | A1* | 4/2020 | Estes | G06F 9/30 |
| 2020/0177529 | A1* | 6/2020 | Trim | H04L 51/32 |
| 2020/0245017 | A1* | 7/2020 | Ganschow | H04N 21/478 |

* cited by examiner

SELECTOR INPUT DEVICE TO TARGET RECIPIENTS OF MEDIA CONTENT ITEMS

CROSS REFERENCED TO RELATED APPLICATIONS

This claims priority to U.S. Provisional Patent Application Ser. No. 62/868,731, filed Jun. 28, 2019, the contents of which are incorporated herein by reference in their entirety.

BACKGROUND

Currently, a number of consumer electronic devices are adapted to capture image, audio as well as video content. For example, a user can now use his mobile device to quickly capture a picture or video that he wishes to send to his friends, family and other contacts.

In order to achieve this, the user may first need to unlock his mobile device, locate the camera application, capture the picture or video using the camera, select the people he wishes to share this picture or video with (e.g., selected recipients), and then transmit the picture or video to the selected recipients. While this process is straightforward, there is a growing demand to be able to visually communicate with one another even more quickly.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Embodiments of the present disclosure improve the functionality of electronic messaging software, apparatuses and systems by allowing the user to more rapidly share media content items with one group of users (e.g., close friends, recently contacted friends, all friends, etc.) or to more rapidly store media content items for the user.

Figure 1:
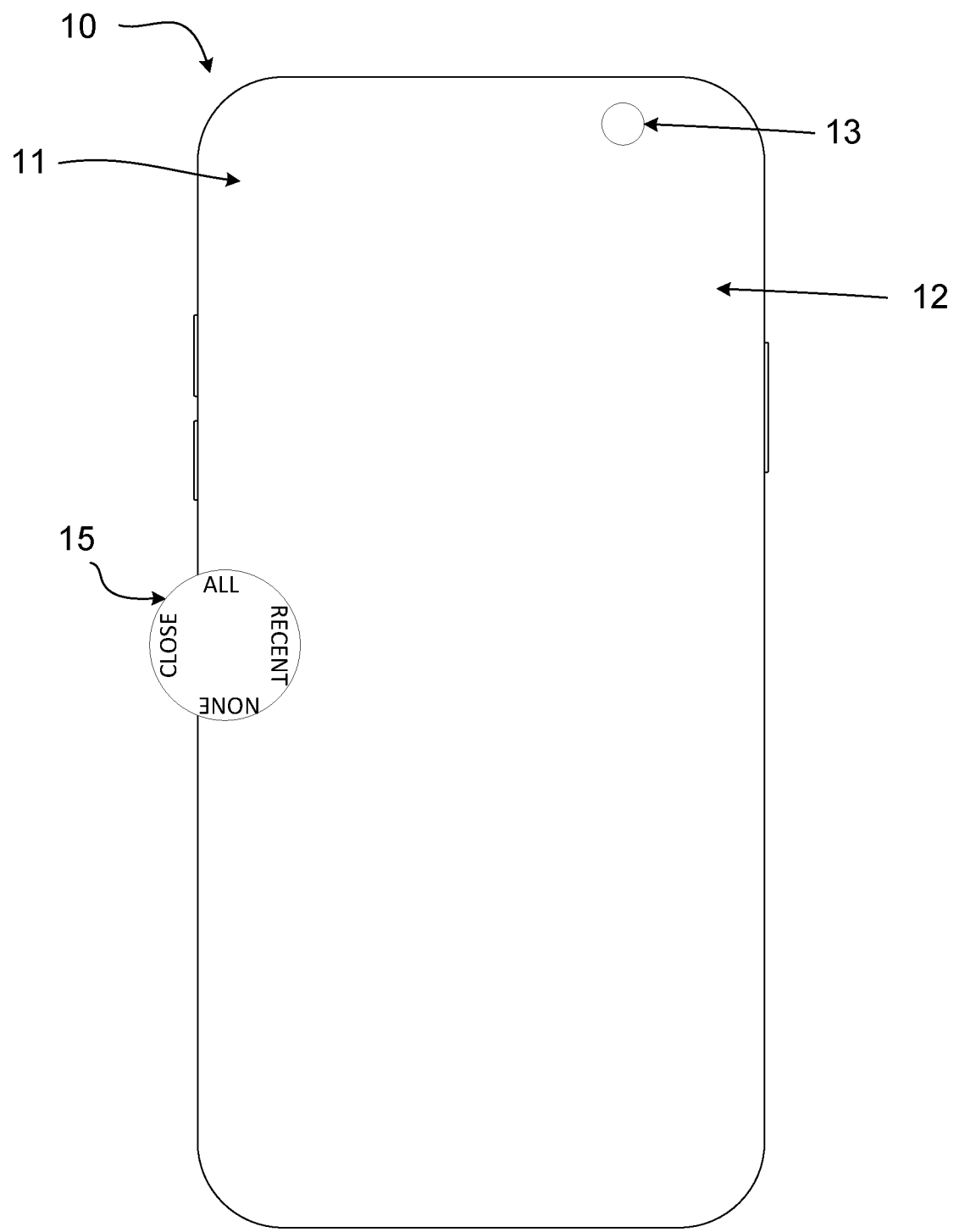
FIG. 1 is an example of a system in which the selector input device can be implemented according to one example embodiment.
Figure 4:
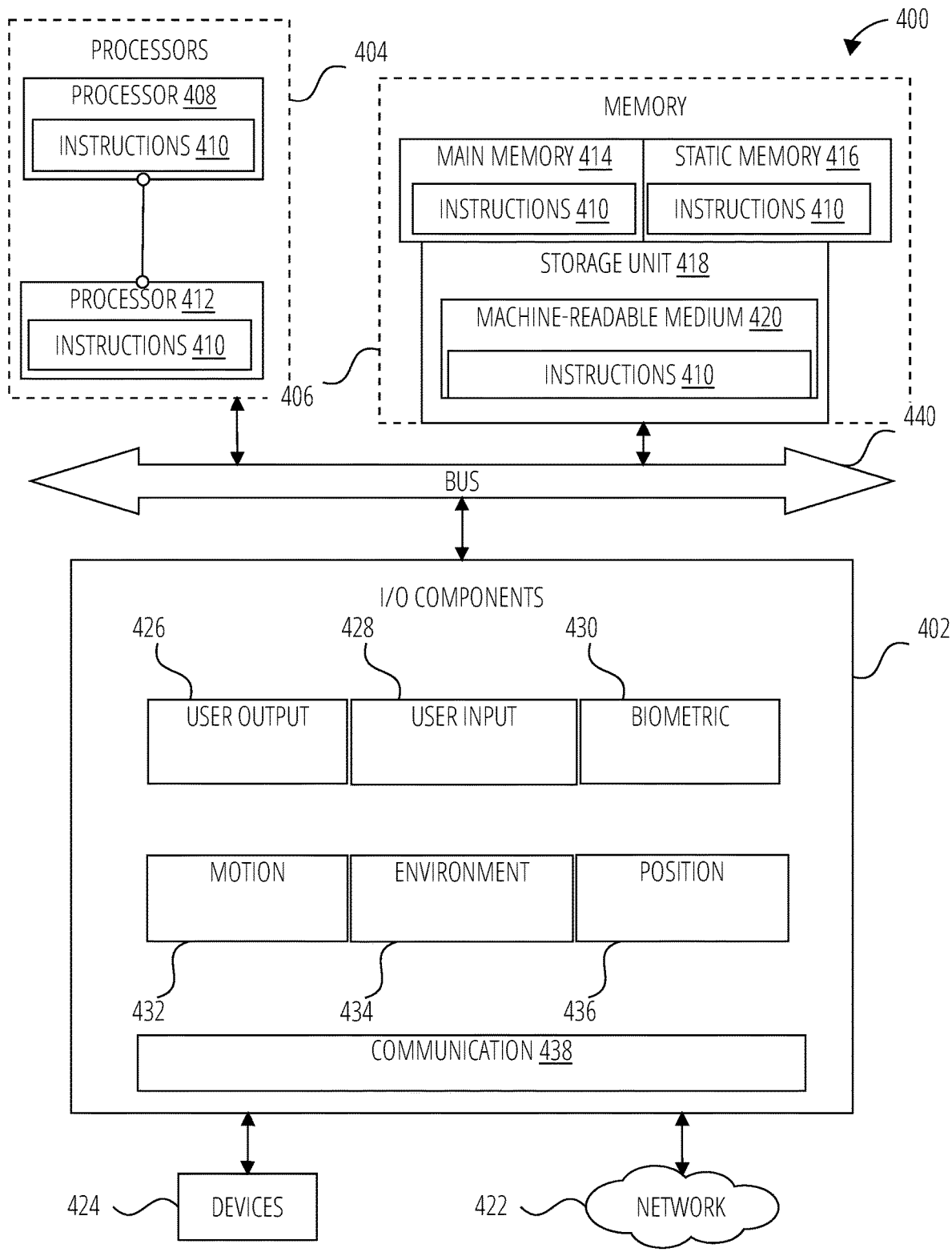
FIG. 4 is a diagrammatic representation of a machine in the form of a computer system within which a set of instructions may be executed for causing the machine to perform any one or more of the methodologies discussed herein, in accordance with some examples.

FIG. 1 is an example of a system 10 in which the selector input device 115 can be implemented according to one example embodiment. The system 10 in FIG. 1 comprises an apparatus 11 and a client device (not shown). In FIG. 1, the apparatus 11 is a housing case or a device extension that can be coupled to a client device. A housing case can be a protective case for the client device. the device extension can be an external device that can be coupled to the client device, for example, magnetically. In some embodiments, the apparatus 11 that is a housing case or a device extension includes a camera that is separate from a camera included in the client device. It is also understood that, in other embodiments, the apparatus 11 is any client device having a camera such as the mobile device. For example, the client device can be the machine 400 as illustrated in FIG. 4.

As shown in FIG. 1, the apparatus 11 comprises a housing 12, a camera opening 13, and a selector input device 15. While not shown in FIG. 1, the apparatus 11 can also comprise a camera, a processor, and a communication interface. In one embodiment, the housing 11 is shaped to be coupled to a client device. In another embodiment, the housing 101 is the housing of the client device having the camera.

In one embodiment, the camera opening 13 is an opening in the housing 12 that couples to a camera lens of a camera included in the apparatus 11. In one embodiment, the camera opening can be a window allowing the camera lens to capture image or video content (e.g., media content items). The camera can include the camera lens and an image sensor. The camera lens may be a perspective camera lens or a non-perspective camera lens. A non-perspective camera lens may be, for example, a fisheye lens, a wide-angle lens, an omnidirectional lens, etc. The image sensor captures digital video through the camera lens. The images may be also be still image frame or a video including a plurality of still image frames.

The selector input device 15 includes a plurality of settings associated with a plurality of groups of recipients. In FIG. 1, the plurality of settings include: "None", "Close", "All", and "Recent". Accordingly, the plurality of groups of recipients can include close contacts of the user of the apparatus 11 (e.g., "Close"), all contacts of the user of the apparatus 11 (e.g., "All), only the user of the apparatus 11 (e.g., "None"), and recent contacts of the user of the apparatus 11 (e.g., "Recent").

In one embodiment, the user's contacts are individuals or businesses connected to the user on a social media platform. The user's contacts can also be individuals or businesses associated with identification information stored on a client device associated with the user.

The close contacts of the user can be a subset of the all the contacts of the user. The close contacts can be automatically determined by the apparatus 11 or by a client device associated with the user. The close contacts of the user can be automatically determined based on the frequency of communications, telephone calls, or visual communications exchanged between the user and the contact. The close contacts of the user can also be set manually by the user. In this embodiment, the user manually selects the contacts that he wishes to include in the close contacts group. The recent contacts of the user include, for example, recent recipients of media content items from the user or recent senders of media content items to the user. The recent contacts can be automatically determined by the apparatus 11 or by a client device associated with the user. In one embodiment, the user can also set the selector input device 15 to the user of the apparatus 11 being the only recipient (e.g., selector input device 15 setting: "None").

As shown in FIG. 1, the selector input device 15 can be a rotary wheel that can be rotated and pressed. For example, the user selects the first setting (e.g., "close contacts") from the plurality of settings by rotating the rotary wheel to the first setting, and by pressing the rotary wheel.

In another embodiment, the selector input device 15 is a plurality of buttons that are associated with the plurality of settings. The user can select the first setting from the plurality of settings by pressing a first button included in the plurality of buttons that is associated with the first setting.

In another embodiment, the selector input device 15 is a slider having a plurality of positions that are associated with the plurality of settings. The user can select a first setting from the plurality of settings by setting the slider to a first position included in the plurality of positions that is associated with the first setting.

The selector input device 15 can be communicatively coupled to the camera and the communication interface. In response to receiving a selection of a first setting (e.g., "close") included in the plurality of settings from the selector input device 15, the camera captures a first media content item, and the communication interface transmits the first media content item to the first group (e.g., "close contacts"). Similarly, in response to receiving a selection of a second setting (e.g., "all") included in the plurality of settings from the selector input device 15, the camera captures a second media content item, and the communication interface transmits the second media content item to the second group (e.g., all the user's contacts).

In one embodiment, when the selector input device 15 is set to a third setting (e.g., "none") that indicates the only recipient is the user of the apparatus 11, in response to receiving the selection of a third setting (e.g., "none") from the selector input device 15, the camera captures a third media content item, and the communication interface transmits the third media content item to a client device associated with the user of the apparatus 11 for viewing and storage in the client device.

In one embodiment, when the selector input device 15 is set to a fourth setting (e.g., "recent"), in response to receiving a selection of a fourth setting (e.g., "recent") included in the plurality of settings from the selector input device 15, the camera captures a fourth media content item, and the communication interface transmits the fourth media content item to the fourth group (e.g., "recent contacts"). The recent contacts of the user include, for example, recent recipients of media content items from the user or recent senders of media content items to the user.

In one embodiment, prior to transmitting the media content item to the selected group of recipients as set using the selector input device 15, the processor included in the apparatus 11 generates a preview of the media content item captured by the camera. The preview of the media content item can be a compressed version of the media content item. For example, when the media content item is an image, the preview of the image is a lower resolution image or a smaller sized version of the image. When the media content item is a video, the preview of the video can be a lower resolution video or a speed-up version (e.g., quick play) of the video.

The communication interface then transmits the preview of the media content item to the client device. When the client device receives the preview of the media content item, a display of the client device is caused to display the preview and a plurality of selectable interface items corresponding to a plurality of groups of recipients. For example, the selectable interface items be associated with the settings such as: "None", "Close", and "All." In this embodiment, the user is able to preview the media content item that was captured and is further able to confirm that this media content item should be sent to the group that was set using the selector input device 15. The selectable interface items can be icons, selectable text, images, etc.

In this embodiment, when the user selects a first selectable interface item of the plurality of selectable interface items, the client device transmits to the communication interface of the apparatus 11 the selection of the first group of recipients.

In another embodiment, the selector input device 15 can be an activation button that that cause the camera to capture the media content item, the processor to generate the preview, and rather than confirm the selection of the group set using the selector input device 15, the user is able to select the group of recipients by using one of the selectable interface items displayed on the client device's display screen.

In one embodiment, when the client device receives the preview of the media content item and a display of the client device is caused to display the preview and the selectable interface items corresponding to the groups of recipients, the user is provided a predetermined period of time to make a selection. When the user does not select any of the plurality of selectable interface items within the predetermined period of time, the client device transmits to the communication interface of the apparatus 11 the selection (e.g., "None") that corresponds the user of the client device being the only recipient of the media content item.

Figure 2:
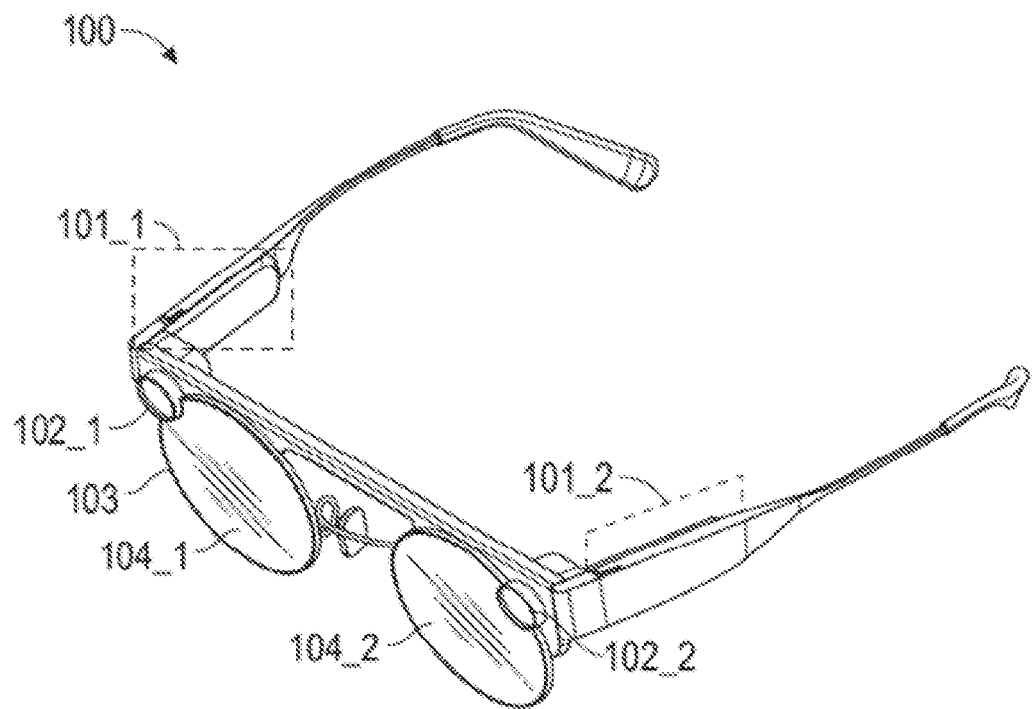
FIG. 2 is an example of a head-wearable apparatus in which the selector input device can be implemented according to one example embodiment.

FIG. 2 is an example of a head-wearable apparatus 100 in which the selector input device can be implemented according to one example embodiment. FIG. 2 illustrates a perspective view of the head-wearable apparatus 100 according to one example embodiment. In FIG. 2, the head-wearable apparatus 100 is a pair of eyeglasses. In some embodiments, the head-wearable apparatus 100 can be sunglasses or goggles. Some embodiments can include one or more wearable devices, such as a pendant with an integrated camera that is integrated with, in communication with, or coupled to, the head-wearable apparatus 100 or a client device. Any desired wearable device may be used in conjunction with the embodiments of the present disclosure, such as a watch, a headset, a wristband, earbuds, clothing (such as a hat or jacket with integrated electronics), a clip-on electronic device, or any other wearable devices. It is understood that, while not shown, one or more portions of the system included in the head-wearable apparatus can be included in a client device (e.g., machine 800 in FIG. 5) that can be used in conjunction with the head-wearable apparatus 100.

In FIG. 2, the head-wearable apparatus 100 is a pair of eyeglasses that includes a frame 103 that includes eye wires (or rims) that are coupled to two stems (or temples), respectively, via hinges and/or end pieces. The eye wires of the frame 103 carry or hold a pair of lenses 104_1, 104_2. The frame 103 includes a first (e.g., right) side that is coupled to the first stem and a second (e.g., left) side that is coupled to the second stem. The first side is opposite the second side of the frame 103.

The apparatus 100 further includes a camera module that includes camera lenses 102_1, 102_2 and at least one image sensor. The camera lens may be a perspective camera lens or a non-perspective camera lens. A non-perspective camera lens may be, for example, a fisheye lens, a wide-angle lens, an omnidirectional lens, etc. The image sensor captures digital video through the camera lens. The images may be also be still image frame or a video including a plurality of still image frames. The camera module can be coupled to the frame 103. As shown in FIG. 2, the frame 103 is coupled to the camera lenses 102_1, 102_2 such that the camera lenses face forward. The camera lenses 102_1, 102_2 can be perpendicular to the lenses 104_1, 104_2. The camera module can include dual-front facing cameras that are separated by the width of the frame 103 or the width of the head of the user of the apparatus 100.

In FIG. 2, the two stems (or temples) are respectively coupled to microphone housings 101_1, 101_2. The first and second stems are coupled to opposite sides of a frame 103 of the head-wearable apparatus 100. The first stem is coupled to the first microphone housing 101_1 and the second stem is coupled to the second microphone housing 101_2. The microphone housings 101_1, 101_2 can be coupled to the stems between the locations of the frame 103 and the temple tips. The microphone housings 101_1, 101_2 can be located on either side of the user's temples when the user is wearing the apparatus 100.

As shown in FIG. 2, the microphone housings 101_1, 101_2 encase a plurality of microphones 110_1 to 110_N (N>1). The microphones 110_1 to 110_N are air interface sound pickup devices that convert sound into an electrical signal. More specifically, the microphones 110_1 to 110_N are transducers that convert acoustic pressure into electrical signals (e.g., acoustic signals). Microphones 110_1 to 110_N can be digital or analog microelectro-mechanical systems (MEMS) microphones. The acoustic signals generated by the microphones 110_1 to 110_N can be pulse density modulation (PDM) signals.

In one embodiment, the selector input device 15 is coupled to one of the temples. The user can select the group of recipients that he wishes to send a media content item using the selector input device 15 on the temple. For example, if the selector input device 15 is a rotary wheel, the user can select the group of recipients (e.g., "close contacts") using the setting associated with this group (e.g., "close") and press the rotary wheel to cause camera in the head-wearable apparatus 100 to capture a picture or video (e.g., media content item) and send the picture or video to the group (e.g., "close contacts") that was set on the selector input device 15.

Figure 3:
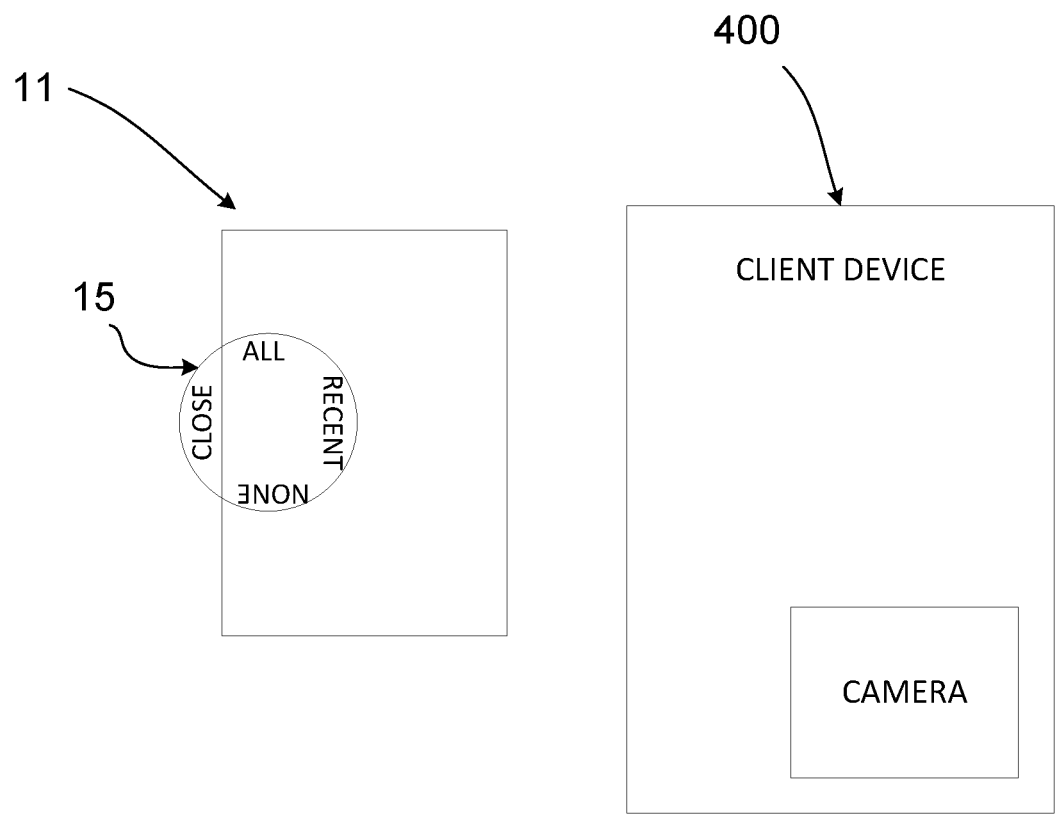
FIG. 3 is an example of a system in which the selector input device can be implemented according to one example embodiment.

FIG. 3 is an example of a system 30 in which the selector input device can be implemented according to one example embodiment. In this embodiment, the system 30 includes an apparatus 11 including the selector input device 15 that is communicatively coupled to the client device 800 that comprises a camera. The selector input device 15 can be communicatively coupled via a wired connection (e.g., USB cables) or a wireless connection (e.g., WiFi, BlueTooth, 5G, etc.).

Some embodiments may include one or more wearable devices, such as a pendant with an integrated camera that is integrated with, in communication with, or coupled to, a client device. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, or any other wearable devices.

In FIG. 3, the apparatus 11 comprises a processor and a selection input device 15. The selection input device 15 is communicatively coupled to the client device 800. The client device 800 comprises a camera which is also communicatively coupled to the selection input device 15. In this embodiment, in response to receiving a selection of a first setting included in the plurality of settings from the selector input device 15, the camera is caused to capture a first media content item, and the client device 800 transmits the first media content item to the first group.

In the embodiments described herein, the selection input device 15 shortens the time or the steps required to capture a media content item and transmit the media content item to desired recipients. For example, in one embodiment, the selection input device 15 is allows the user to capture a picture or video and transmit to a selected group of recipients by simply selecting the setting and pressing the input (e.g., rotary wheel). The selection input device 15 further leverages the fact that most users communicate with a select group of contact most frequently (e.g., "Close Contacts") when they are not communicating to all of their contacts (e.g., "All"). In some embodiments, the selection input device 15 also allows the user to not have to use of the camera included in the client device. This further allows for faster visual communication since the user is not required to unlock the client device to access the camera.

Machine Architecture

FIG. 4 is a diagrammatic representation of the machine 400 within which instructions 410 (e.g., software, a program, an application, an applet, an app, or other executable code) for causing the machine 400 to perform any one or more of the methodologies discussed herein may be executed. For example, the instructions 410 may cause the machine 400 to execute any one or more of the methods described herein. The instructions 410 transform the general, non-programmed machine 400 into a particular machine 400 programmed to carry out the described and illustrated functions in the manner described. The machine 400 may operate as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein. The machine 400, for example, may comprise the client device or any one of a number of server devices forming part of a messaging server system. In some examples, the machine 400 may also comprise both client and server systems, with certain operations of a particular method or algorithm being performed on the server-side and with certain operations of the particular method or algorithm being performed on the client-side.

The machine 400 may include processors 404, memory 406, and input/output I/O components 638, which may be configured to communicate with each other via a bus 440. In an example, the processors 404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 408 and a processor 412 that execute the instructions 410. The term "processor" is intended to include multi-core processors that may comprise two or more independent processors (sometimes referred to as "cores") that may execute instructions contemporaneously. Although FIG. 4 shows multiple processors 404, the machine 400 may include a single processor with a single-core, a single processor with multiple cores (e.g., a multi-core processor), multiple processors with a single core, multiple processors with multiples cores, or any combination thereof.

The memory 406 includes a main memory 414, a static memory 416, and a storage unit 418, both accessible to the processors 404 via the bus 440. The main memory 406, the static memory 416, and storage unit 418 store the instructions 410 embodying any one or more of the methodologies or functions described herein. The instructions 410 may also reside, completely or partially, within the main memory 414, within the static memory 416, within machine-readable medium 420 within the storage unit 418, within at least one of the processors 404 (e.g., within the Processor's cache memory), or any suitable combination thereof, during execution thereof by the machine 400.

The I/O components 402 may include a wide variety of components to receive input, provide output, produce output, transmit information, exchange information, capture measurements, and so on. The specific I/O components 402 that are included in a particular machine will depend on the type of machine. For example, portable machines such as mobile phones may include a touch input device or other such input mechanisms, while a headless server machine will likely not include such a touch input device. It will be appreciated that the I/O components 402 may include many other components that are not shown in FIG. 4. In various examples, the I/O components 402 may include user output components 426 and user input components 428. The user output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 402 may include biometric components 430, motion components 432, environmental components 434, or position components 436, among a wide array of other components. For example, the biometric components 430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 432 include acceleration sensor components (e.g., accelerometer), gravitation sensor components, rotation sensor components (e.g., gyroscope).

The environmental components 434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device may have a camera system comprising, for example, front cameras on a front surface of the client device and rear cameras on a rear surface of the client device. The front cameras may, for example, be used to capture still images and video of a user of the client device (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device may also include a 360° camera for capturing 360° photographs and videos.

Further, the camera system of a client device may include dual rear cameras (e.g., a primary camera as well as a depth-sensing camera), or even triple, quad or penta rear camera configurations on the front and rear sides of the client device. These multiple cameras systems may include a wide camera, an ultra-wide camera, a telephoto camera, a macro camera and a depth sensor, for example.

The position components 436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 402 further include communication components 438 operable to couple the machine 400 to a network 422 or devices 424 via respective coupling or connections. For example, the communication components 438 may include a network interface Component or another suitable device to interface with the network 422. In further examples, the communication components 438 may include wired communication components, wireless communication components, cellular communication components, Near Field Communication (NFC) components, Bluetooth° components (e.g., Bluetooth® Low Energy), WiFi® components, and other communication components to provide communication via other modalities. The devices 424 may be another machine or any of a wide variety of peripheral devices (e.g., a peripheral device coupled via a USB).

Moreover, the communication components 438 may detect identifiers or include components operable to detect identifiers. For example, the communication components 438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 438, such as location via Internet Protocol (IP) geolocation, location via Wi-Fi® signal triangulation, location via detecting an NFC beacon signal that may indicate a particular location, and so forth.

The various memories (e.g., main memory 414, static memory 416, and memory of the processors 404) and storage unit 418 may store one or more sets of instructions and data structures (e.g., software) embodying or used by any one or more of the methodologies or functions described herein. These instructions (e.g., the instructions 410), when executed by processors 404, cause various operations to implement the disclosed examples.

The instructions 410 may be transmitted or received over the network 422, using a transmission medium, via a network interface device (e.g., a network interface component included in the communication components 438) and using any one of several well-known transfer protocols (e.g., hypertext transfer protocol (HTTP)). Similarly, the instructions 410 may be transmitted or received using a transmission medium via a coupling (e.g., a peer-to-peer coupling) to the devices 424.

Software Architecture

Figure 5:
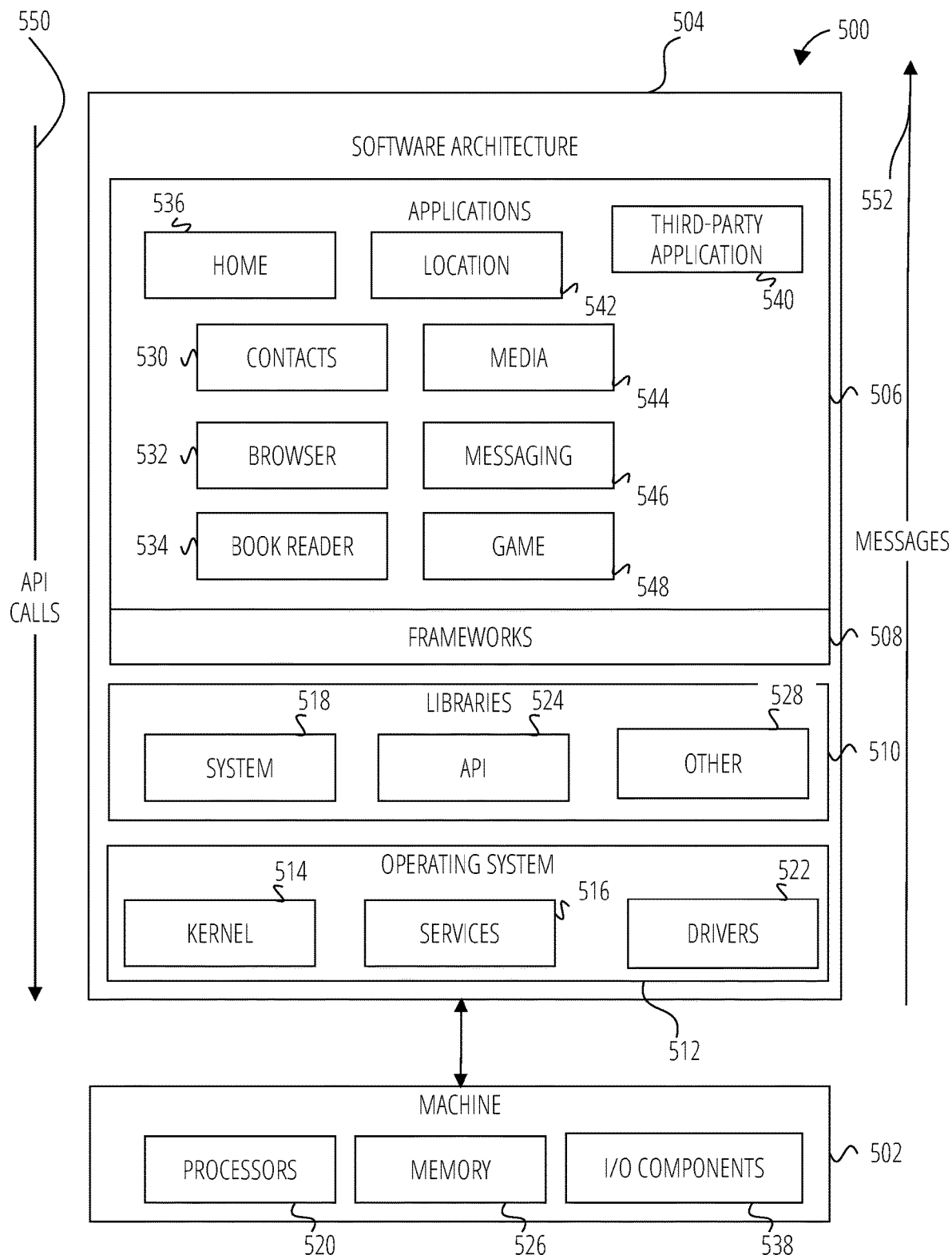
FIG. 5 is a block diagram showing a software architecture within which examples may be implemented.

FIG. 5 is a block diagram 500 illustrating a software architecture 504, which can be installed on any one or more of the devices described herein. The software architecture 504 is supported by hardware such as a machine 502 that includes processors 520, memory 526, and I/O components 538. In this example, the software architecture 504 can be conceptualized as a stack of layers, where each layer provides a particular functionality. The software architecture 504 includes layers such as an operating system 512, libraries 510, frameworks 508, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionality. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 510 provide a common low-level infrastructure used by the applications 506. The libraries 510 can include system libraries 518 (e.g., C standard library) that provide functions such as memory allocation functions, string manipulation functions, mathematic functions, and the like. In addition, the libraries 510 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 510 can also include a wide variety of other libraries 528 to provide many other APIs to the applications 506.

The frameworks 508 provide a common high-level infrastructure that is used by the applications 506. For example, the frameworks 508 provide various graphical user interface (GUI) functions, high-level resource management, and high-level location services. The frameworks 508 can provide a broad spectrum of other APIs that can be used by the applications 506, some of which may be specific to a particular operating system or platform.

In an example, the applications 506 may include a home application 536, a contacts application 530, a browser application 532, a book reader application 534, a location application 542, a media application 544, a messaging application 546, a game application 548, and a broad assortment of other applications such as a third-party application 540. The applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party application 540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 540 can invoke the API calls 550 provided by the operating system 512 to facilitate functionality described herein.

Figure 6:
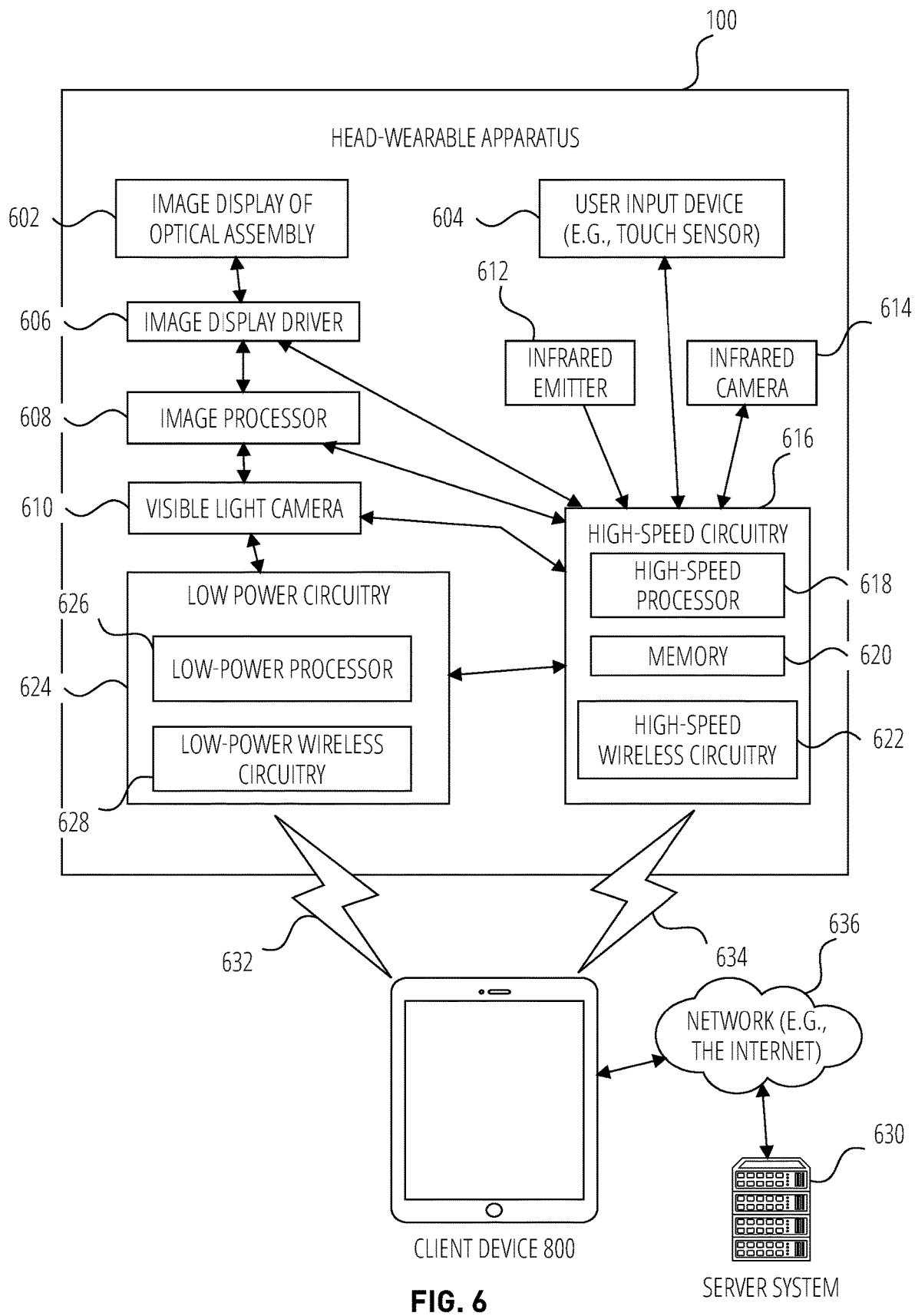
FIG. 6 is a high-level functional block diagram of an example head-wearable apparatus communicatively coupled a mobile device and a server system via various networks.

FIG. 6 is a high-level functional block diagram of an example head-wearable apparatus 100 communicatively coupled a mobile device 800 and a server system 630 via various networks.

Apparatus 100 includes a camera, such as at least one of visible light camera 610, infrared emitter 612 and infrared camera 614. The camera can include the camera module with the lens 104_1, 104_2 in FIG. 2.

Client device 800 can be capable of connecting with apparatus 100 using both a low-power wireless connection 628 and a high-speed wireless connection 622. Client device 800 is connected to server system 630 and network 636. The network 636 may include any combination of wired and wireless connections.

Apparatus 100 further includes two image displays of the optical assembly 602. The two image displays 636 include one associated with the left lateral side and one associated with the right lateral side of the apparatus 100. Apparatus 100 also includes image display driver 606, image processor 608, low-power circuitry 624, and high-speed circuitry 616. Image display of optical assembly 602 are for presenting images and videos, including an image that can include a graphical user interface to a user of the apparatus 100.

Image display driver 606 commands and controls the image display of the optical assembly 602. Image display driver 606 may deliver image data directly to the image display of the optical assembly 602 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, apparatus 100 includes a frame 103 and stems (or temples) extending from a lateral side of the frame 103. Apparatus 100 further includes a user input device 604 (e.g., touch sensor or push button) including an input surface on the apparatus 100. The user input device 604 (e.g., touch sensor or push button) is to receive from the user an input selection to manipulate the graphical user interface of the presented image.

The components shown in FIG. 6 for the apparatus 100 are located on one or more circuit boards, for example a PCB or flexible PCB, in the rims or temples. Alternatively or additionally, the depicted components can be located in the chunks, frames, hinges, or bridge of the apparatus 100. Left and right visible light cameras 610 can include digital camera elements such as a complementary metal-oxide-semiconductor (CMOS) image sensor, charge coupled device, a lens 104_1, 104_2, or any other respective visible or light capturing elements that may be used to capture data, including images of scenes with unknown objects.

Apparatus 100 includes a memory 620 which stores instructions to perform a subset or all of the functions described herein for generating binaural audio content. Memory 620 can also include storage device.

As shown in FIG. 6, high-speed circuitry 606 includes high-speed processor 618, memory 620, and high-speed wireless circuitry 622. In the example, the image display driver 606 is coupled to the high-speed circuitry 616 and operated by the high-speed processor 618 in order to drive the left and right image displays of the optical assembly 602. High-speed processor 618 may be any processor capable of managing high-speed communications and operation of any general computing system needed for apparatus 100. High-speed processor 618 includes processing resources needed for managing high-speed data transfers on high-speed wireless connection 634 to a wireless local area network (WLAN) using high-speed wireless circuitry 622. In certain examples, the high-speed processor 618 executes an operating system such as a LINUX operating system or other such operating system of the apparatus 100 and the operating system is stored in memory 620 for execution. In addition to any other responsibilities, the high-speed processor 618 executing a software architecture for the apparatus 100 is used to manage data transfers with high-speed wireless circuitry 622. In certain examples, high-speed wireless circuitry 622 is configured to implement Institute of Electrical and Electronic Engineers (IEEE) 802.11 communication standards, also referred to herein as Wi-Fi. In other examples, other high-speed communications standards may be implemented by high-speed wireless circuitry 622.

Low-power wireless circuitry 628 and the high-speed wireless circuitry 622 of the apparatus 100 can include short range transceivers (Bluetooth™) and wireless wide, local, or wide area network transceivers (e.g., cellular or WiFi). Client device 800, including the transceivers communicating via the low-power wireless connection 632 and high-speed wireless connection 634, may be implemented using details of the architecture of the apparatus 100, as can other elements of network 636.

Memory 620 includes any storage device capable of storing various data and applications, including, among other things, camera data generated by the left and right visible light cameras 610, infrared camera 614, and the image processor 608, as well as images generated for display by the image display driver 606 on the image displays of the optical assembly 602. While memory 620 is shown as integrated with high-speed circuitry 616, in other examples, memory 620 may be an independent standalone element of the apparatus 100. In certain such examples, electrical routing lines may provide a connection through a chip that includes the high-speed processor 618 from the image processor 608 or low-power processor 626 to the memory 620. In other examples, the high-speed processor 618 may manage addressing of memory 620 such that the low-power processor 626 will boot the high-speed processor 618 any time that a read or write operation involving memory 620 is needed.

As shown in FIG. 6, the processor 618 of the apparatus 100 can be coupled to the camera (visible light cameras 610; infrared emitter 612, or infrared camera 614), the image display driver 606, the user input device 604 (e.g., touch sensor or push button), and the memory 620.

Apparatus 100 is connected with a host computer. For example, the apparatus 100 is paired with the client device 800 via the high-speed wireless connection 634 or connected to the server system 630 via the network 636. Server system 630 may be one or more computing devices as part of a service or network computing system, for example, that include a processor, a memory, and network communication interface to communicate over the network 636 with the client device 800 and apparatus 100.

The client device 800 includes a processor and a network communication interface coupled to the processor. The network communication interface allows for communication over the network 632 or 634. Client device 800 can further store at least portions of the instructions for generating a binaural audio content in the client device 800's memory to implement the functionality described herein.

Output components of the apparatus 100 include visual components, such as a display such as a liquid crystal display (LCD), a plasma display panel (PDP), a light emitting diode (LED) display, a projector, or a waveguide. The image displays of the optical assembly are driven by the image display driver 606. The output components of the apparatus 100 further include acoustic components (e.g., speakers), haptic components (e.g., a vibratory motor), other signal generators, and so forth. The input components of the apparatus 100, the client device 800, and server system 630, such as the user input device 604, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Apparatus 100 may optionally include additional peripheral device elements. Such peripheral device elements may include biometric sensors, additional sensors, or display elements integrated with apparatus 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 632 and 634 from the client device 800 via the low-power wireless circuitry 628 or high-speed wireless circuitry 622.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. An apparatus comprising:
a camera comprising a camera lens and an image sensor;
a communication interface; and
a selector input device communicatively coupled to the camera and the communication interface, the selector input device being a physical input device comprising a plurality of physical settings, the plurality of physical settings of the physical input device being associated with a plurality of groups of recipients, respectively, the plurality of groups of recipients including a first group and a second group;
in response to receiving a selection of a first physical setting included in the plurality of physical settings from the selector input device,
the camera captures a first media content item, and
the communication interface transmits the first media content item to the first group,.
wherein the selection of the first physical setting comprises a single activation that causes both capturing of the first media content item and transmitting of the first media content item to the first group.

2. The apparatus of claim 1, wherein
in response to receiving a selection of a second physical setting included in the plurality of physical settings from the selector input device, the camera captures a second media content item, and
the communication interface transmits the second media content item to the second group,. wherein the selection of the second physical setting comprises a single activation that causes both capturing of the second media content item and transmitting of the second media content item to the first group.

3. The apparatus of claim 1, wherein the selector input device is a rotary wheel, wherein a user selects the first physical setting from the plurality of settings by rotating the rotary wheel to the first physical setting, and by pressing the rotary wheel, wherein pressing the rotary wheel set to the first physical setting is the single activation.

4. The apparatus of claim 1, wherein the selector input device is a plurality of buttons, wherein the plurality of buttons are associated with the plurality of physical settings, wherein a user selects the first physical setting from the plurality of physical settings by pressing a first button included in the plurality of buttons that is associated with the first physical setting, wherein pressing the first button is the single activation.

5. The apparatus of claim 1, wherein the selector input device is a slider having a plurality of positions, wherein the plurality of positions are associated with the plurality of physical settings, wherein a user selects the first physical setting from the plurality of physical settings by setting the slider to a first position included in the plurality of positions that is associated with the first physical setting, wherein setting the slider to the first position is the single activation.

6. The apparatus of claim 1, wherein the first group includes a subset of all a user's contacts and the second group includes all the user's contacts.

7. The apparatus of claim 6, wherein the user's contacts are individuals or businesses connected to the user on a social media platform.

8. The apparatus of claim 6, wherein the user's contacts are individuals or businesses associated with identification information stored on a client device associated with the user.

9. The apparatus of claim 6, wherein the plurality of groups of recipients includes a third group that includes only the user of the apparatus, wherein in response to receiving a selection of a third physical setting included in the plurality of physical settings from the selector input device,
the camera captures a third media content item, and
the communication interface transmits the third media content item to a client device associated with the user for viewing and storage.

10. The apparatus of claim 6, wherein the plurality of groups of recipients includes a third group that includes recent recipients of media content items from the user or recent senders of media content items to the user, wherein in response to receiving a selection of a third physical setting included in the plurality of physical settings from the selector input device,
the camera captures a third media content item, and
the communication interface transmits the third media content item to the third group.

11. The apparatus of claim 1, wherein the media content item is an image or a video.

12. The apparatus of claim 1, wherein the apparatus is coupled to a client device associated with a user.

13. The apparatus of claim 12, wherein the apparatus is a housing case or a device extension that is coupled to the client device associated with the user.

14. The apparatus of claim 1, wherein the apparatus is a head-wearable apparatus comprising:

a frame coupled to the camera; and
a first temple and a second temple coupled to opposite sides of the frame, wherein the selector input device is coupled to the first temple.

15. A system comprising:
a client device associated with a user; and
an apparatus comprising:
a processor;
a camera comprising a camera lens and an image sensor;
a communication interface; and
a selector input device being a physical input device comprising a plurality of physical settings, the selector input device comprising a plurality of physical settings, the plurality of physical settings of the physical input device being associated with a plurality of groups of recipients, respectively, the plurality of groups of recipients including a first group and a second group,
in response to receiving a selection of a first physical setting included in the plurality of physical settings from the selector input device,
the camera captures a first media content item, and
the communication interface transmits the first media content item to the first group,
wherein the selection of the first physical setting comprises a single activation that causes both capturing of the first media content item and transmitting of the first media content item to the first group.

16. The system of claim 15, wherein in response to receiving an activation signal from the selector input device,
the camera captures a media content item,
the processor generates a preview of the media content item, and
the communication interface transmits the preview of the media content item to the client device,
wherein when the client device receives the preview of the media content item,
a display of the client device is caused to display the preview.

17. The system of claim 15, wherein
the selector input device is a rotary wheel, wherein a user selects the first physical setting from the plurality of settings by rotating the rotary wheel to the first physical setting, and by pressing the rotary wheel, wherein pressing the rotary wheel set to the first physical setting is the single activation.

18. A system comprising:
a client device comprising a camera comprising a camera lens and an image sensor;
an apparatus comprising a selector input device communicatively coupled to the camera, the selector input device being a physical input device comprising a plurality of physical settings, the plurality of physical settings of the physical input device being associated with a plurality of groups of recipients, respectively, the plurality of groups of recipients including a first group and a second group;
in response to receiving a selection of a first physical setting included in the plurality of physical settings from the selector input device,
the camera is caused to capture a media content item, and
the client device transmits the media content item to the first group,
wherein the selection of the first physical setting comprises a single activation that causes both capturing of the first media content item and transmitting of the first media content item to the first group.

19. The system of claim 18, wherein the apparatus is coupled to the client device.

20. The system of claim 18, wherein the media content item is an image or a video.

* * * * *